United States Patent

[11] 3,598,005

| [72] | Inventor | Donald S. Shafer<br>Cincinnati, Ohio |
| --- | --- | --- |
| [21] | Appl. No. | 690,827 |
| [22] | Filed | Dec. 15, 1967 |
| [45] | Patented | Aug. 10, 1971 |
| [73] | Assignee | Watkins Manufacturing Company<br>Cincinnati, Ohio<br>Continuation-in-part of application Ser. No. 431,003, Feb. 8, 1965, now abandoned, Continuation of application Ser. No. 460,795, June 2, 1965, now abandoned. |

[54] MACHINE TOOLS
21 Claims, 9 Drawing Figs.

[52] U.S. Cl............................................. 82/46, 82/70.1, 82/101, 29/104, 90/15
[51] Int. Cl........................................... B23b 5/14, B23b 3/04
[50] Field of Search............................ 82/25, 46, 47, 50, 70.1, 83, 1, 89, 98, 101, 102, 2.5, 4, 3, 90; 143/4, 105, 59; 144/242; 29/104, 103; 90/11, 15

[56] References Cited
UNITED STATES PATENTS

| 1,098,167 | 5/1914 | Potter......................... | 82/98 |
| --- | --- | --- | --- |
| 1,698,250 | 1/1929 | Adams ........................ | 82/89 |
| 2,301,028 | 11/1942 | Esch............................ | 90/15 |
| 2,811,884 | 11/1957 | Jones........................... | 82/2.5 |
| 3,118,333 | 1/1964 | Pilcher et al................. | 82/47 |
| 3,264,911 | 8/1964 | Crider......................... | 82/4 |
| 2,022,433 | 11/1935 | Roemer....................... | 29/103 |
| 2,356,038 | 8/1944 | Edwards...................... | 82/90 |

FOREIGN PATENTS

| 238,272 | 4/1962 | Australia..................... | 82/101 |
| --- | --- | --- | --- |
| 332,207 | 7/1930 | Great Britain............... | 82/48 |
| 735,185 | 5/1943 | Germany..................... | 82/83 |
| 332,307 | 7/1930 | Great Britain............... | 82/48 |

OTHER REFERENCES

Catalog-" Der Traub Automat" catalog 39 of 1963-Published by Herman Traub Machinenfabrik and distributed by Traub (USA) Inc., South Terminal Drive and Commercial St., Plainview L. I., N.Y. 6 pages (Front & Rear Coverpages and pages 3, 4, 6 and 9)

*Primary Examiner*—Harrison L. Hinson
*Attorney*—Joseph A. Rave

ABSTRACT: The cutoff machine of the present invention is continuously operated to cut off successive ends of a metal bar, and said cutoff is effected through the use of a toothed circular saw cutter of a thickness at least one-half of the thickness thereof, as advised to be used by mechanical engineering handbooks, and rotating said toothed circular saw cutter at a speed in excess of that presently suggested in said handbooks whereby the saw is given rigidity and stiffness to accomplish the desired cutting off of a metal circular workpiece bar. Rotating said circular workpiece bar at a speed, again, considerably greater than the aforementioned engineering handbooks recommend and effecting a feed between the rotating toothed circular saw cutter and bar workpiece considerably greater than that presently recommended by the aforementioned engineering handbooks. This results in savings in waste material and a material reduction in time per piece produced.

Patented Aug. 10, 1971
3,598,005
4 Sheets-Sheet 1
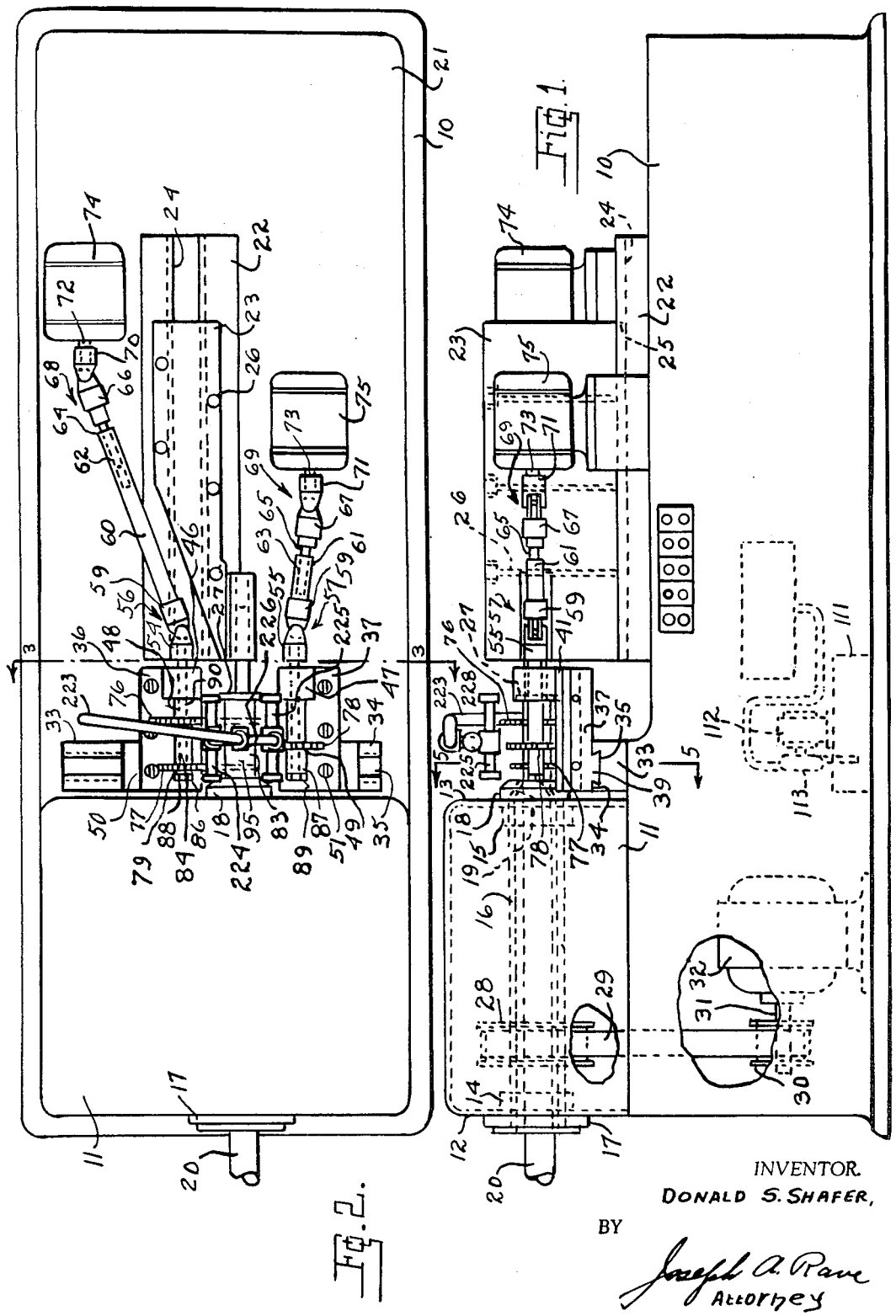
INVENTOR.
DONALD S. SHAFER,
BY
Joseph A. Rane
Attorney

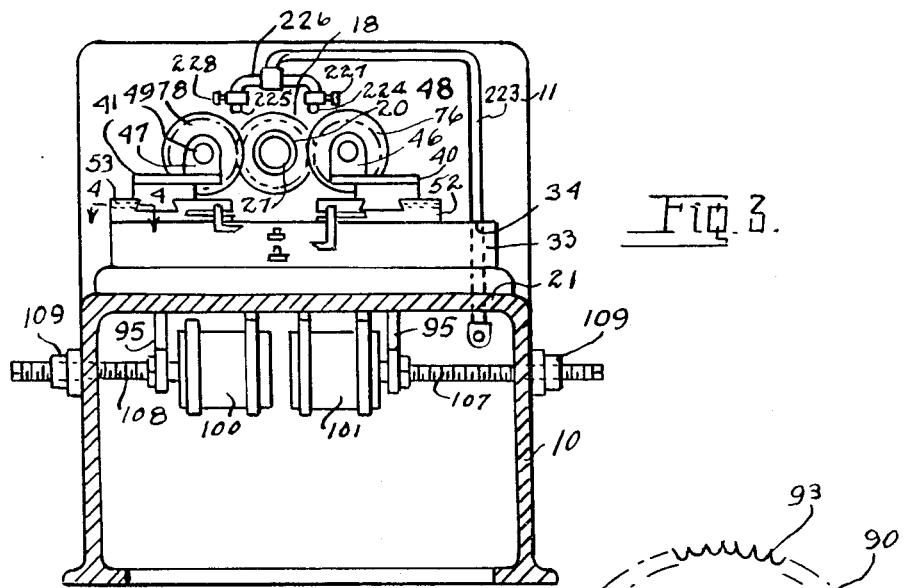
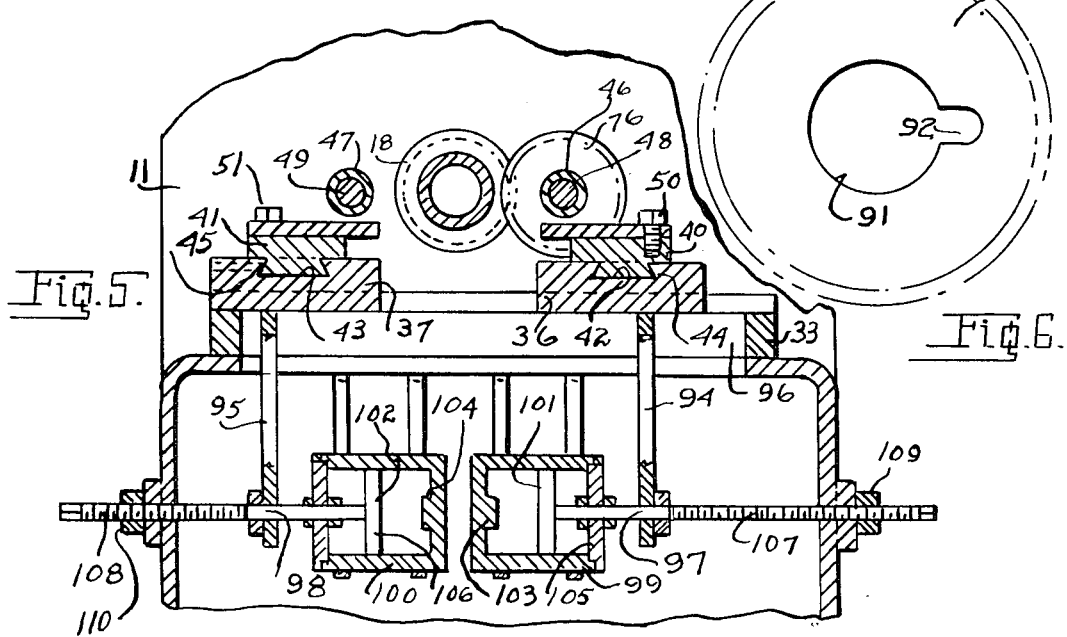
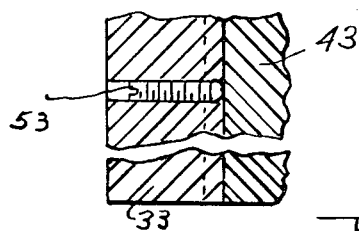

INVENTOR.
DONALD S. SHAFER
BY
Joseph A. Crane
Attorney

INVENTOR
DONALD S. SHAFER

MACHINE TOOLS

This application is a continuation-in-part application of the application of Donald S. Shafer for Machine Tools, filed Feb. 8, 1965, Ser. No. 431, 003, and further, is a continuation application of the application of Donald S. Shafer for Machine Tools filed June 2, 1965, Ser. No. 460,795 both now abandoned.

SUMMARY OF THE INVENTION

A principal object of this invention is the provision of a cutoff machine wherein the resultant individual pieces from bar stock, solid and tubular, are considerably less in cost than such cutoff pieces as produced by heretofore known machine tools and methods for this purpose.

Another object of this invention is the provision of a method of operating a cutoff machine tool whereby the cutoff pieces, whether solid or tubular, are, in the trade, called "slugs," are much more rapidly produced than are said cutoff pieces, slugs, by methods heretofore known and used and which slugs, as produced by the machine and method of the present invention, are more accurate in size and more readily and accurately further machinable than the pieces produced heretofore.

A further object of the present invention is the provision of a machine tool and the method of operating same whereby tools may be employed that results in considerable savings in material while at the same time producing said cutoff pieces, slugs, at an exceedingly rapid rate and in a condition more readily usable.

In a very broad sense, the machine tool of the present invention may be likened to what is known as a "Screw Machine," since such machines are capable of producing cutoff parts in succession from bar stock, whether from a single or plurality of said bar stock, and with the said bar stock being advanced with respect to the machine tool, substantially as soon as the preceding cutoff has been completed.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

FIG. 1 is a side elevational view of a machine tool embodying the improvements of the present invention.

FIG. 2 is a top plan view of the machine shown in FIG. 1.

FIG. 3 is a transverse view through the machine as seen from line 3–3 on FIG. 1.

FIG. 4 is an enlarged sectional view through a portion of the machine, showing a detail thereof, as seen from line 4–4 on FIG. 3.

FIG. 5 is an enlarged sectional view through the tools cross slides as seen from line 5–5 on FIG. 3.

FIG. 6 is a plan or elevational view of a typical cutoff tool or saw blade as employed with the machine of the present invention and forming a detail of the present invention.

Throughout the several views of the drawings, herein above set forth, the same or similar reference characters are employed to denote the same or similar parts.

Figure 7:
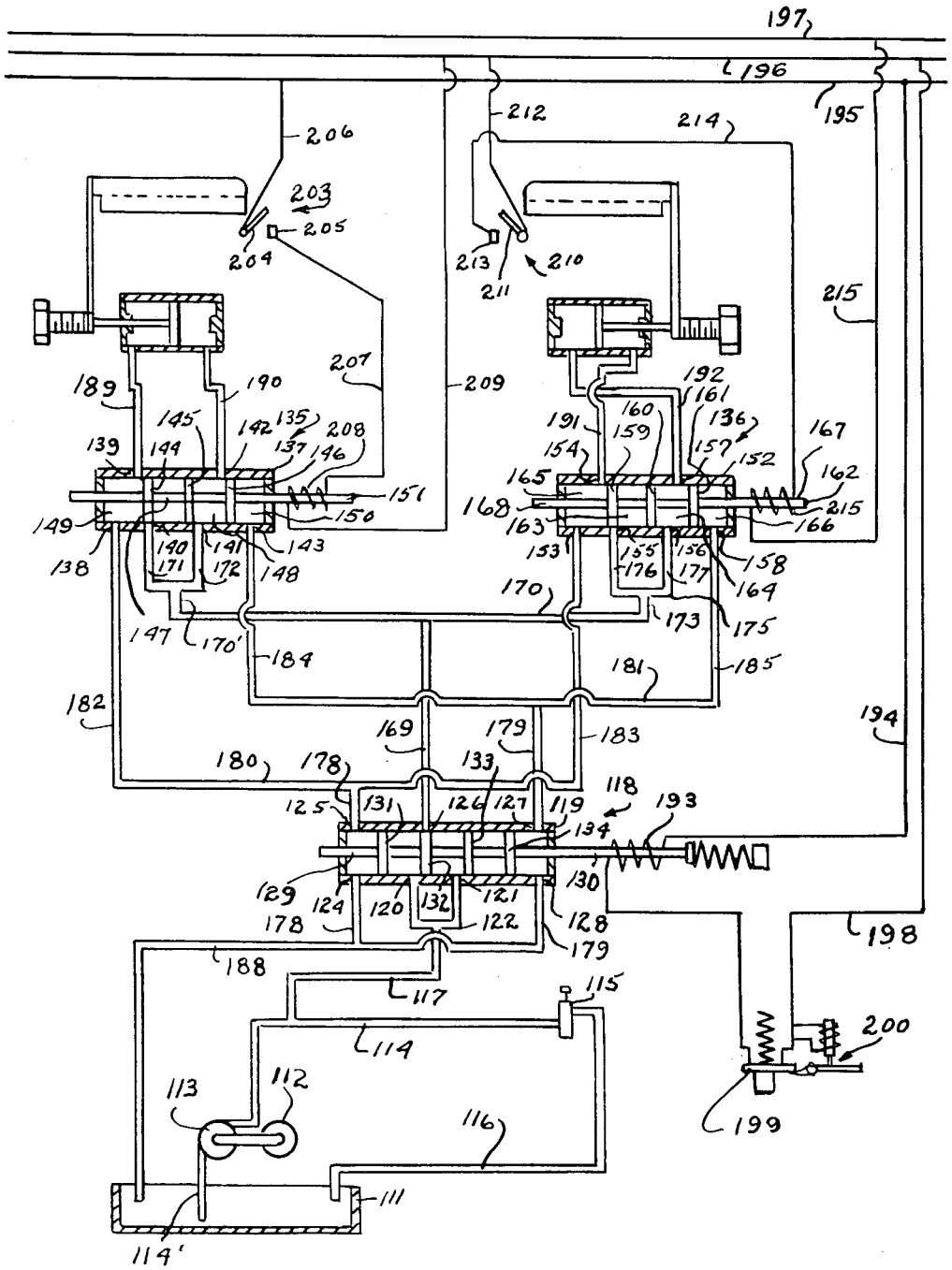
FIG. 7 is a view of hydraulic and electric circuits or diagrams involved in this machine in a substantially complete operation.

While, as above intimated, the present machine operates in somewhat a similar manner with that of a screw machine, since said screw machine effects various operations on the end of a bar stock, such as forming, drilling, reaming, and the like, with the final operation being that of cutting off the said formed part, or end, of the said bar stock. The present machine will be described with relation only to the cutoff of the end of the bar stock, advancing the bar stock and subsequently again cutting off the bar stock until the entire bar stock has been cut.

It should also be noted that the transverse cross section of the bar stock may have any form in elevation such as round, square, hexagonal, and the like, and at the same time may be either solid or hollow, as in the form of a tube. It should further be noted that if the bar stock is solid the cutting off must be continuous until the center or axis of the bar is reached, while if the bar stock is hollow or tubular the cutting off tool need penetrate only to the inner face of the bar stock hollow center.

Specifically, as disclosed in the drawing, use is made of a suitable support or bed 10 generally hollow and within the interior of which various parts, or suitable subassemblies, of the machine tool may be disposed. Supported on said bed at one end thereof is the head or headstock 11 having enclosing walls, such as end walls 12 and 13 and inwardly of the said end walls 12 and 13, respectively, project bearing bosses 14 and 15. The bearing bosses 14 and 15 are in axial alignment and provide or enclose bearings in which is mounted a work rotating spindle 16. The spindle 16 is hollow and is secured in place against end wise or axial movement through suitable securing means 17 and 18. Associated with the spindle-securing means or member 18 is a collet 19 which is periodically opened to permit the advancement of the bar stock 20 and for immediately securing the said bar stock in each position of advancement. The bar stock 20 shown in the drawings being cylindrical and solid in cross section.

The bed 10 is provided at its upper surface with a bed plate 21 having upstanding therefrom and extending from substantially one end of the supporting bed and its bed plate is a bearing block 22 on which is mounted, for adjustment toward and from the head 11, an adjustable stop supporting slide 23. The bearing block 22 is provided longitudinally thereof with a guiding groove 24, dovetailed in cross section, receiving a depending guiding tongue 25 similarly dovetailed in cross section. Any suitable or desirable means may be employed for adjusting the slide 23 and locking same in operative position. In the present instance the slide 23 is manually adjusted by manually engaging and moving the same and then locked in adjusted positions by means of clamp screws 26 extending along the side of the slide and impinging on the upper surface of the bearing block 22 laterally of the dovetailed guide groove 24 therein.

Secured to the adjustable slide 23, at the end thereof nearer the head 11, is a stop 27 which engages the inner, or adjacent end of the bar stock 20 for positioning it accurately with respect to the cutoff tool or tools, as will presently be described.

The spindle 16 is adapted to be rotated as is the bar stock centrally thereof and for which purpose the spindle 16 has keyed or otherwise secured thereto a pulley 28 about which is trained a driving belt 29, in turn, extending around a pulley 30 on the motor shaft 31 outwardly projecting from an electric motor 32 which is of a variable speed construction and wherefore the spindle and bar stock may be rotated at different speeds. The speed or r.p.m. of the motor and work rotating spindle is, of course, related to the diameter of the bar stock being worked on, since, it is obvious, that bar stock of various diameters may be used or worked on.

A second slide supporting block 33 upstands from the bed plate 21 substantially adjacent the inner end of the stop supporting slide 23 with said block 33 having formed downwardly of its upper or sliding surface 34 a dovetailed guiding groove 35. It should be noted that the said guiding groove 35 extends for the full length of the supporting block 33.

Mounted on the sliding surface of the slide block 33, and extending inwardly of, approximately, each end thereof is a cross slide 36 and 37 which are substantially similar to one another with said slides respectively having projecting therefrom a dovetailed guide 38 and 39 disposed in the transverse slide block groove 35.

The cross slides 36 and 37 are each in turn, provided with a tool slide 40 and 41 each having a downwardly projecting dovetailed guiding tongue 42 and 43 and respectively disposed in a dovetailed guideway 44 and 45 formed in the said cross slides 36 and 37 downwardly of their upper sliding surfaces. Secured on each tool slide 40 and 41 is a bearing block 46 and 47, respectively, rotatably supporting a tool spindle 48 and 49. The said bearing blocks 46 and 47 are secured in any suitable or desirable manner to its tool slide, as by clamp screws 50 and 51, extending through a laterally projecting portion of bearing blocks 46 and 47, see FIG. 3. The said tool slides are adjustable in the dovetailed guideways and as shown in the drawings the said adjustment may be effected by manually grasping the same and after adjustment to the desired position are secured in operative position by clamp screws 52 and 53 respectively carried by the cross slides 36 and 37 for impinging against the tool slides depending guide tongues 42 and 43, see FIG. 4.

As seen in FIG. 2 each of the tool spindles 48 and 49 has outwardly of its bearing block one portion 54 and 55, respectively, of a universal joint, respectfully, indicated in its entirety by the reference numerals 56 and 57. The second portions 58 and 59, respectively, of the universal joints 56 and 57 has extending therefrom a driving member 60 and 61 with which is respectively telescoped at 62 and 63 a driven sliding bar 64 and 65, respectively, keyed at their sliding joint with their respective driven part and with each driven bar 64 and 65, at its outer end, carrying one part 66 and 67 of a second pair of universal joints, respectively, indicated in its entirety by the reference numerals 68 and 69. The companion or second part 70 and 71 of the universal joints 68 and 69 are, respectively, secured to a motor shaft 72 and 73 of variable speed electric motors 74 and 75. The said motors 74 and 75 are respectively secured to the upper surface of the bed plate 21 and laterally of the slide supporting and bearing block 22, as seen in FIG. 2.

Each of the tool spindles 48 and 49 has secured thereto an operating tool which, in effect, simultaneously operates on the projecting end of the bar stock 20. As seen in the drawings the tool spindle 48 has secured thereto a pair of cutoff saws, respectively, indicated by the reference numerals 76 and 77 while the tool spindle 49 has secured thereto a single cutoff saw 78. It should be noted that this arrangement is such that it can be reversed or each tool spindle carry but a single saw or each tool spindle carry a pair of saw or even more, as the nature of the work permits.

It should be also understood that a machine including a single spindle and therefore a single tool or cutoff saw may be employed as when cutting lengths of hollow workpieces.

The saws are secured to their respective spindles in a relation to one another that they finish or complete their operation in succession, that is, if two or more saws are employed on the spindles the innermost portion will first be cut from the outer or free end of the work stock or bar and successive portions will be successively cut toward the headstock. The said saws are secured in operative relation to one another through bushings 79, respectively, on the tool spindles 48 and 49 and which bushings space the saws that the resulting portion between saws is of identical length.

Specifically, the tool spindle 48 has a bushing 80 from the bearing 46 to its first saw 76 and since the work stock, as will presently be made clear, is in alignment with the inner end of the said bearing 46 the bushing 80 represents the length of the first portion 81 of the bar stock being removed or severed from the end thereof. The first saw 78 on the spindle 49 has a bushing 82 thereon which extends between the inner end of its supporting bearing 47 and itself, the said saw 78, thereon. This bushing 82 is double the length of the bushing 80 plus the thickness of the saw 76 wherefore the second section or portion 83 from the end of the bar stock will be of the exact length as the first section 81 from the end thereof. Mounted on the tool spindle 48 is a second bushing 84 which is equal in length to the bushing 82 and is therefore twice the length of the bushing 80 plus the thickness of the saw 78 and the third section or portion 85 of the bar stock being severed is again of the same length as the two sections or portions 81 and 83 previously cut or removed from the bar stock.

In order to effect this operation without difficulty or sticking of the saws and the bar stock end sections, the said saws 76, 78 and 77 decrease in diameter wherefore the bar stock first section or end portion 81 is first severed from the bar stock by the saw 76 whereupon the second bar stock section or portion 83 is severed from the bar stock by the saw 78 and finally followed by severance of the third section or portion 85 of the bar stock through the action of the saw 77. The saws are clamped on their respective tool spindles through a final makeup bushing section 86 and 87 against which the clamping nuts 88 and 89 engage through the threads on the ends of their respective tool spindles.

The tool slides are adapted to be actuated toward and from one another and toward and from the work, bar stock, by any suitable or desirable means. There is disclosed in the drawing a means for effecting a complete operative cycle and which means will be subsequently described in detail.

It is desirable, in some instances, essential, as will later be made clear, that a liquid coolant be supplied to the cutoff tools and work while the said work is being cutoff. Obviously, any suitable or desirable mechanism may be utilized for this purpose, such for example, as disclosed in the drawings and particularly in FIG. 8.

Figure 8:
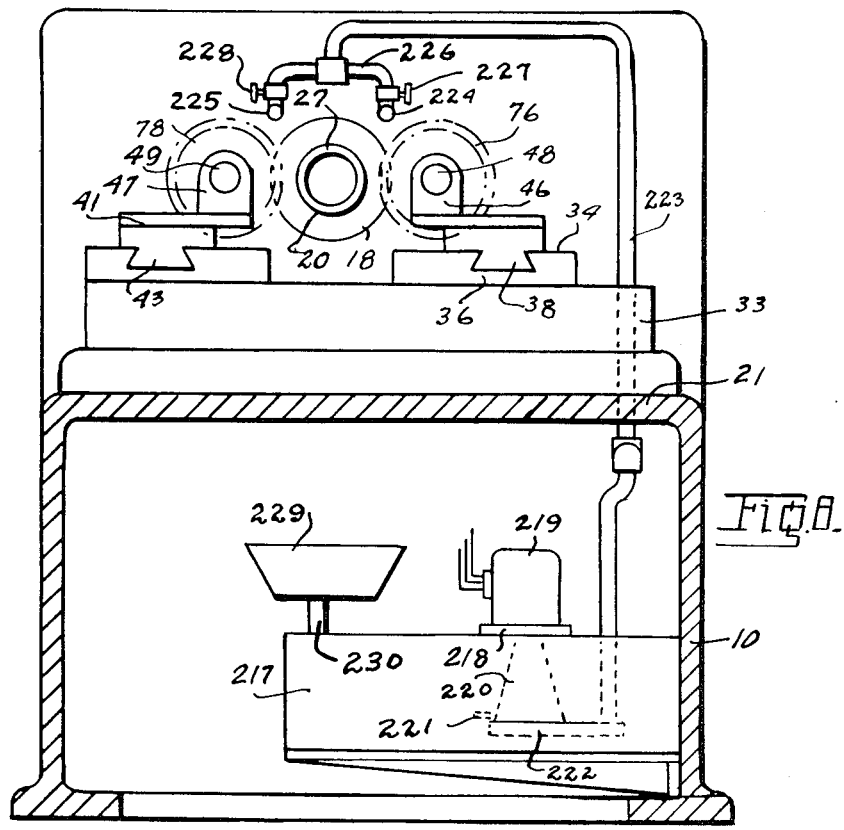
FIG. 8 is a transverse sectional view through the machine on line 8–8 on FIG. 1.

As shown in FIG. 8 use is made of a coolant supply tank 217 disposed within the bed 10 and preferably mounted on a bracket 218 carried by one of the bed sides to project inwardly thereof. Extending across the top of the tank 217 is a platform 218 on which is mounted a suitable motor 219. The motor 219 has connected therewith a pump 220 which has an inlet 221 and an outlet 222.

The coolant pump is such that it will develop sufficient pressure within the discharge 222 to raise the said coolant to a point substantially equal to the total height of the bed. The said pump discharge 222 therefore has connected with it a pipe 223 which terminates at its other end in a pair of nozzles 224 and 225 and which nozzles are disposed directly above the point of contact of the work and cutoff tools.

The said nozzles 224 and 225 are each connected through a distributor pipe 226 with the main supply pipe 223. Each of the nozzle supply pipes has therein a shutoff and regulating valve, respectively, indicated by the reference numerals 227 and 228. The said valves 227 and 228 not only control the rate of flow through their respective nozzles 224 and 225 but are also employed to shut off one or the other of said nozzles in the event that a single cutoff saw is employed or a plurality of cutoff saws, each on one or the other of the tool spindles 48 and 49.

The fluid coolant when liquid, that is water, oil, or the like, after passing the saw and work piece is collected, in what may be termed, a coolant catch basin 229. The catch basin 229 is connected by a pipe 230 to the coolant tank 217 for recirculation. Obviously a certain amount of chips are carried with the coolant through the catch basin 229 and return pipe 230 into the coolant tank 217 and these chips and other foreign objects are screened before the coolant is again circulated through the system.

From the foregoing it will be noted that both the workpiece and tool, circular disc having a serrated periphery, are power rotated during the cutoff operation and which function, tool and workpiece rotation, is the heart of the present invention in the production of cutoff parts whether of some length or of extremely short length, such as, in the production of what is generally termed a "slug." Slugs may be solid pieces from solid bar stock of an elevational cross section of round, hexagonal, square, or any regular or irregular cross section so long as it can be fed through the driving or rotating spindle to a given point or stop and then clamped in position during cutoff. Slugs may also be hollow, like tubing, regularly round or of any cross section, supra, and have an opening axially, or otherwise, thereof and again of any desired outline or cross section plan which can be fed through the driving or rotating spindle to a given stop and then clamped in position during cutoff. The slugs are subsequently further processed in the production of an article by methods having no relation to the present machine or to one another. In other words, one such slug measuring seven sixty-fourths inch thick and 1 11/16 inches in diameter, cut from a solid aluminum bar, is subsequently stamped and extruded as a can including its one end and vertically disposed walls and having the capacity of 12 fluid ounces. Similar slugs of steel are likewise formed or extruded to provide a steel can or other parts.

As noted above the principal object of the present invention is the production of these, and other, parts in an expeditious manner and at a cost well below that of any method heretofore known. At the same time, and as is well known, the production of the parts by machine tools and methods heretofore known frequently resulted in the said part being extremely difficult to further process. This difficulty resulted from the fact that the slug or other part, cut from the bar stock during the cutting off thereof, generates such heat that the subsequent cooling of the cutoff part resulted in a "hardened" condition requiring that the part or slug be annealed before the subsequent processes could be performed thereon. At the same time the said slugs were frequently discolored due to the heat generated during their cutoff process and which discoloration rendered the cutoff parts unacceptable for further use until such discoloration was obliterated.

Each and every one of these disadvantages are overcome in the present machine due, as noted above, to the rotation of the work, bar stock, and the rotation of the cutoff tool, saw. Furthermore by the present invention a relatively extremely thin circular saw blade is employed and in some instances the said saw blade may be nothing more than a circular disc of the saw material with no peripheral teeth. Specifically however it is desired that the saw or cutoff tool have teeth and preferably the teeth by similar to those for cutting a "screwdriver slot" in the end of a screw, bolt, or the like. There is illustrated in FIG. 6 of the drawings a typical or acceptable cutoff tool or cutter of the saw type.

As was noted above the saws or other cutoff tools as employed herewith have a thickness which rarely exceeds thirty-two thousandths of an inch. The only heretofore known similar device or tool for cutting purposes was an abrasive disc of a width several times the width of the cutoff saws of the present invention. From this it follows that the savings in material, in view of the kerfs from the cutoff tools, as heretofore known and the applicant's cutoff tool or saws, it considerable even over abrasive discs.

By the present invention, and depending somewhat on the material being worked on, use has been made of cutoff saws from six-thousandths of an inch to thirty-two thousandths of an inch in thickness with no difficulty in producing hundreds and even thousands of parts from each saw.

In operation, the machine of the present invention has produced cutoff pieces from bar stock and in which the surface speed, for ferrous metals, range between 900 f.p.m. to speeds of, and in access of, 1,200 f.p.m., while with nonferrous metals the surface speeds varied between 7,165 f.p.m. to 21,000 f.p.m..

With the surface speeds as hereinabove set forth the cutoff parts or slugs had their surfaces absolutely parallel to one another, had their surfaces free of any discoloration due to friction heat, and were in substantially the identical condition of hardness as the bar stock from which they were cut and for which reasons the said parts, particularly slugs, could be immediately further processed.

Specifically, and as noted above, the cutoff saw in FIG. 6 has a body portion 90 centrally of which is a passageway or aperture 91 of a size depending on the size of the arbor or tool spindle on which it is mounted. Extending from the aperture or central opening is a keyway 92 for locking the saw on its arbor or spindle against relative independent rotation. As noted above the saw body 90 is provided with peripheral teeth 93 which may and preferably do take the form of the teeth usually employed with a screwdriver slot cutter.

It should be noted however that the results obtained from the machine tool of the present invention is not dependent entirely on the above specifically identified saw teeth since, results have been obtained from cutting discs with no saw teeth but merely through action of the friction between the cutter and bar and with such cutoff parts having none of the objections thereto usually resulting from the employment of machines and methods heretofore known and used.

The speed of rotation of the cutter results in each tooth of the cutter, cutting saw, being in contact with the material an exceedingly brief time, as will presently be made clear. This short or brief time of contact is such that there is substantially no transfer of heat from either the chips or its parent metal into the cutter tool. This results in eliminating the chief reason or factor on tooth wear and or distortion due to heat, and thereby contributes to long life for the cutter.

In order to more fully understand this nontransfer of heat, assuming the cutting saw has 72 teeth, it is believed the following formula will apply:

$Nm = r.p.m. \times Nc$ in which:

$Nm$ = teeth contacting workpiece per minute $Nc$ = number of teeth in cutter and in which:

$Nm = 10,000 \times 72$ therefore $Nm = 720,000$ and considering 60 seconds per minute the following result is obtained:

$720,000/60$ (sec.) = 12,000 teeth per second strikes and removes a chip from the work.

In view of the foregoing and in cutting off a slug 1 inch in diameter in 1 second of time and using a 0.032-inch thick cutter, 3 inches in diameter, approximately 0.025 cubic inches of material is removed in the said second.

From the foregoing the following formula follows:

$Cl$ = chip load per tooth and wherein, in view of the above example with 12,000 cutter teeth striking the work per second, each cutter tooth removes approximately 0.0000021 cubic inches chip load per tooth of material. The removal of this small volume of material per tooth practically eliminates burrs which are formed by pressure of a tooth attempting to take a relatively large chip, as is the conventional practice. Also, due to the extremely small size of the chips which results means there is no need for high torque and horsepower valves in the cutter rotating mechanism and work.

The cutting operation as above set forth is done with a tooth or saw that has no "set" to the teeth nor do the individual teeth have any relief or clearance whatsoever on the sides thereof for chip clearance. In this respect attention is called to FIGS. 1, 2 and 6 wherein the saws have parallel sides with teeth having their sides in the same plane as the sides of the teeth.

While a relatively specific arrangement of coolant to the tool and work has been set out above it should be noted that almost any fluid, which includes gaseous, lubricant may be used in this part of the machine and mode of operation of the present invention. The liquid lubricant is used to eliminate the tendency of the sides of the cutter, revolving as it does to such high speeds relative to and in combination with the speed of the work, for preventing this said speed to develop friction that could readily weld the cutter and material being cut to one another.

When the cutter is rotated in a direction contrary or opposite to the direction of rotation of the workpiece each tooth on the cutter forms the function of introducing the coolant or lubricant into the slot or trough being made and ahead of it for thereby, in effect, lubricating the cutter path and at the same time carrying with it the cooling effect of the coolant or lubricant. This operation, in effect, is, it may be said, by a osmosis action. Also, the cutter while rotating at the speeds above indicated causes, due to the centrifugal force thereon, the cutter to be stiffened and wherefore cutters as thin as 0.006 inches, supra, may be employed in this work.

It has also been found that due to the speed of rotation of both the cutter and the work and the holding of friction heat to a minimum the slugs are produced with end surfaces that seem to be polished and with no discoloration whatsoever therein nor is the normal hardness characteristic in the slug in any wise changed. No cutoff process heretofore known produces this result.

To more clearly understand the foregoing it should be noted that work speeds given or recommended for materials in handbooks are greatly exceeded by the process and the mechanism of the present invention. For example, the handbooks or textbooks set forth the machineability of SAE 1112 steel as rotating 165 surface feet per minute and the feed of the work to the tool is recommended as 0.002 inches per revolution. The same material in the machine of the present invention and using the method herein set forth, the rotating cutoff tool method, machines at a rate of at least 900 surface feet per minute and a feed rate of at least 0.010 inches per revolution of work is utilized for thereby reducing the time required to cut off each workpiece.

Another example of the terrific difference between the present invention and that heretofore known, SAE steel 4027 by the textbooks or handbooks should have a cutting off rotating speed or surface speed of 45 feet per minute together with a feed of 0.001 of an inch per revolution and a kerf of 0.062 of an inch, while with the machine and method of the present invention the cutting speed was 423 surface feet per minute and a feed of 0.0155 inches per revolution and a kerf of 0.032 of an inch.

A still further example of the difference between the previously accepted standards and that obtained by using the process and machine of the present invention, the material employed was 6061 F aluminum and wherein the cutting speed heretofore accepted was 450 feet per minute with a feed of 0.002 inches per revolution and using a cutter having a kerf of 0.062 of an inch. As distinguished from this, in machining the above noted aluminum, the machine and process of the present invention utilized a cutting speed of 4,436 feet per minute and a feed of 0.0226 inches per revolution with a cutter kerf of 0.032 of an inch. In view of the large number of materials cut off by the present method and machine numerous examples could be set forth but, it is believed, with the foregoing and the following examples the complete range of the present machine will be fully understood.

On free-cutting yellow brass and utilizing a work bar stock 1 inch in diameter the handbooks recommend for cutting off slugs or pieces that a cutting speed in feet per minute should be 906 with a feed of 0.0035 inches per revolution and a saw having a width and leaving a kerf of 0.062 inches. With the present machine and method of cutoff as herein disclosed a cutting speed of 4,965 feet per minute and a feed of 0.012 inches per revolution with the cutoff saw having a kerf of 0.032 of an inch.

With such material as tough pitch fully annealed electrolytic 25 to +oz. silver per ton white pine copper the standard handbooks recommend a cutting surface speed of 60 feet per minute, a feed of 0.001 of an inch per revolution and a cutting off saw leaving a kerf of 0.062 of an inch. With this material and a workpiece bar stock 1⅞inches in diameter the machine and method of this application rotated the said workpiece at a cutting surface speed of 2,886 per minute and a feed of 0.0138 inch per revolution and using a cutoff saw giving a kerf of 0.032 inch.

As a matter of fact relatively small diameter cutting-off tools such as burrs as used in dental work and having a serrated diameter of 0.5 inch have been employed at a rate of 450,000 r.p.m. and with the workpiece or stock of a very small diameter such as exceedingly hard wire, frequently referred to as piano wire, rotated at a speed in the category of that herein above set forth with excellent result in so far as maintenance of overall dimension, surface finish as hereinafter set forth, and saving in material are concerned.

Figure 9:
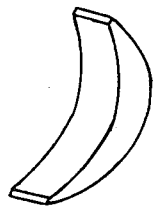
FIG. 9 is a perspective view of a chip from the machine of the present invention, many, many, times enlarged.

With the tool, cutoff saw, and the work operating at the speeds herein above set forth the resulting chips were, to the touch, very fine and powdered. A close examination under a power microscope disclosed the chip to have a formation which is basically similar to a "quarter moon" and illustrated in the drawings in FIG. 9. The said chips have a width equal to the width of the cutter, saw, being used and a length determined by the time the cutter tooth was in contact therewith and which resulted in the said chip having the said shape of a "quarter moon" with extremely thin ends.

It has been found that with the speeds as above set forth the desired length of workpieces is as it should be and that the finish on the ends of each workpiece whether steel, aluminum, brass or copper, such as the examples set forth above had a finish that was surprising to say the least. A test of the said finishes indicated that they were within 10 to 60 microinch finish, some ends of the various materials even seeming to be polished.

From the foregoing, and in view of experiments in high-speed machining the following was disclosed, a. an incredible increase in tool life;

b. the length size of the slugs produced were exceedingly accurate, that is, there was practically no measurable differences between successive cutoff pieces or slugs.

c. cutting at rates above indicated, from 900 surface feet per minute to 21,000 surface feet per minute for the average material and including for exceedingly small diameter materials, a speed of 450,000 r.p.m., enormous and terrific amounts of metal are removed with the use of flat blade and since at these speeds the, what may be considered extremely thin, cutoff tools, saws, an enormous amount of stock is saved since, as noted above, the width or kerf as employed in the present application is approximately one-half that which was considered acceptable prior to the present application.

As further noted above any means commensurate with the spirit of the present invention may be employed for operating the tools and work, bar stock, during the cutting off operation. One such complete cyclic operating mechanism is disclosed diagrammatically in FIG. 7 which is to be read in conjunction with certain of the other Figures.

In order that the said saws, or other cutoff tools, may effect their proper and specific operation, the cross slides 36 and 37 have respectively depending therefrom arms 94 and 95 which pass through an opening 96 downwardly and longitudinally of the cross slides supporting block 33. The said arms 94 and 95 are respectively secured to the ends 97 and 98 of hydraulically actuated piston rods outwardly projecting, respectively, from cylinders 99 and 100.

As will presently be obvious, the cross slides 36 and 37 are actuated toward one another and as will be presently set forth the first slide to complete its final operation will be automatically retracted. Specifically, and as shown in the drawings, this will be the slide 37 since, while slide 36 effects the first cutoff operation through its saw 76 it still has to further travel until the saw 77 completes its operation, but since saw 78 will complete its operation prior to that of the saw 77 the slide 37 will have completed its work cycle of operation prior to the completion of the work cycle of the slide 36 and will return to its normal inoperative position, and remain there while the slide 36 completes its work cycle and returns to its normal inoperative position.

The hydraulic means or circuit for effecting the cyclic operation of the said tool slides 36 and 37 is illustrated in FIG. 7 and wherein the piston rods 97 and 98 are illustrated as respectively connected to pistons 101 and 102 respectively in the cylinders 99 and 100. The said cylinders are each, respectively, closed at one end by the head 103 and 104 with the other ends of said cylinders normally open but respectively closed by heads 105 and 106 and each head provided with an aperture through which the piston rods 97 and 98 reciprocate to effect the sliding movement of the cross slides 36 and 37 through the depending arms 94 and 95.

In view of the fact that the diameter of the bar stock 20 may vary from setup to setup or the diameters of the cutoff saws may vary and thereby requiring more or less travel of the said cross slides 36 and 37 use is made of a variable stop to limit the outward movement of the cross slide and which variable stop is conveniently in the form of a stop screw 107 and 108 respectively threaded through the rear vertical wall and the front vertical wall of the bed 10 and with said screws secured in adjusted positions by lock nuts 109 and 110 thereon.

It is in this position of the parts that a cycle of operation takes place, and which complete cycle of operation, including the electrical controls therefore, is as follows:

Disposed within the hollow interior of the bed 10 is a sump or tank 111 on and above which is an electric motor 112 connected with, to be driven thereby, is a hydraulic pump 113. The pump 113 has depending therefrom a suction pipe or conduit 114' which enters the tank 111 to be below the upper level of the hydraulic medium disposed in the said tank 111. Outwardly extending from the pump 113 is a feed or pressure pipe or conduit 114 having therein a pressure-controlling valve 115, adjustable to the desired operating pressure for the system. Extending from the regulating valve 115 is a pipe or conduit 116 that extends to the sump or tank 111. Extending from the pressure line or conduit 114 is a branch pressure line or conduit 117 that terminates in the main control valve indicated in its entirety on FIG. 7 by the reference numeral 118.

The main control valve 118 comprises a valve sleeve 119 through which is formed apertures 120 and 121 with which is connected the outlet or branch ends of a Y-member 122.

The valve sleeve 119 is further provided with apertures 124, 125, 126, 127 and 128, with certain of said apertures on each side of the inlet apertures 120 and 121 and with which said apertures, 124—128, is connected the ends of other pipes or conduits as will presently be made clear.

Disposed within the main valve sleeve 119 is a spool-type valve indicated in its entirety by the reference numeral 129 and including a stem 130 on which is formed spool or land portions 131, 132, 133 and 134 having between the said spool or land portions spaces or cannelures. The spool-type valve 129 is adapted to be axially shifted so as to connect through the various spaces or cannelures the valve sleeve ports or openings. With the starting valve in the position illustrated the hydraulic fluid, usually oil, in pressure line 114 is cut off from the machine and merely passes through the control or pressure regulating valve 115 to the return pipe or conduit 116, to the sump or tank 111.

Each of the cross slides piston and cylinder mechanisms, 99—101 and 100—102, is provided with its own control valve indicated in the drawings, respectively, by the reference numerals 135 and 136.

Each of said cross slide control valves 135 and 136 is substantially identical to the other with the control valve 135 including a valve sleeve 137 through which is formed apertures 138, 139, 140, 141, 142 and 143. Disposed within the valve sleeve 137 is a spool type valve including spool portions or lands 144, 145 and 146 having between them reduced portions or cannelures 147 and 148. Within the valve sleeve 137 but outwardly of the spool or land portions 144 and 145 there are provided cannelures or reduced portions 149 and 150. The spool portions or lands are connected with one another by a valve stem 151 which projects outwardly of the closed ends of the valve sleeve 137 and respectively act as cores for solenoids to be subsequently described.

The control valve 136, as noted above, is substantially identical with the control valve 135 and includes a valve sleeve 152 through which extends, to the interior thereof, apertures 153, 154, 155, 156, 157 and 158. Disposed within said valve sleeve 152 is a spool-type valve including spool or land portions 159, 160 and 161 respectively connected with one another in spaced apart relations by a valve stem 162 to provide between the said spool portions 159 and 160, and 160 and 161, respectively, cannelures 163 and 164. Outwardly of the spool or land portions 159 and 161 and the adjacent closed ends of the said valve sleeve 152 are cannelures 165 and 166. The valve stem has its opposite ends 167 and 168 outwardly projecting from the valve sleeve and closures to act as cores for electrical solenoids, as will presently be made clear.

As was noted above, the pressure pipe or conduit 114 through the branch pipe or conduit 117 terminates in the Y-member 122 with the stem thereof connected with the said pressure pipe or conduit 114 while the Y-branches respectively connect with ports 120 and 121 in the main control valve sleeve 119. The said main control valve sleeve 119 has connected with its port 126 a pipe or conduit 169 connected with a pipe or conduit 170, from one end of which extends a pipe constituting the stem of a Y-member 170' which includes the Y-member branches, respectively, indicated by reference numerals 171 and 172. The said Y-member 170' has its arms or branches 171 and 172 respectively connected with the cross slide control valve sleeve ports 140 and 141. Extending from the other end of the pipe or conduit 170 is a pipe or conduit 173 again forming or constituting the stem of a Y-member 175 which has its arms 176 and 177 connected with the ports 155 and 156 of the slide control valve sleeve 152.

The remaining ports 125 and 127 of the main control valve sleeve have respectively connected therewith pipes or conduits 178 and 179 which, respectively, terminate in a pipe or conduit 180 and 181. The pipe or conduit 180 has extending from its one end a pipe or conduit 182 that terminates in the port 138 of cross slide control valve sleeve port 138 and the pipe or conduit 180 has extending from its other end a pipe or conduit 183 that terminates in the port 153 of cross slide control valve sleeve 152. Similarly, the pipe or conduit 181 has extending from its opposite ends pipes or conduits 184 and 185 with said pipes or conduits terminating, respectively, in cross slide control valves 135 and 136 with the pipe or conduit 184 being connected with valve sleeve 137 and pipe or conduit 185 being connected with valve sleeve 152.

The main control valve sleeve 119 has connected with its ports 124 and 128 pipes or conduits 186 and 187 which extend from a pipe or conduit 188 that terminates in the sump or tank 111. Ports 139 and 142 of slide control valve sleeve 137, and the similar ports 154 and 157 of control valve slide sleeve 152 have respectively connected therewith pipes or conduits 189, 190, 191 and 192 of which pipes or conduits 189 and 191, respectively, connect with one end of cylinders 99 and 100 of the pistons 101 and 102 for moving the cross slides toward each other, while the pipes or conduits 190 and 192 are connected with said cylinders 99 and 100 on the other side of their pistons 101 and 102.

The main control valve 118 is shown in FIG. 7 in its neutral or stop position and wherefore the pressure in the pipe or conduit 114 is blocked by the said control valve. As noted above the said main control valve member has its stem outwardly projecting from one end of its sleeve 119 to act as a core for an electric solenoid coil 193 which has extending from one end thereof a wire 194 that is connected to a main circuit wire 195 of a three-wire system and which three-wire system also includes wires 196 and 197. It should be noted that the wires 195 and 196 together constitute a circuit going back to an electric circuit supply source while wires 196 and 197 likewise form a circuit from the electrical current source. The usual electrical potential across the wires 195 and 196 and 196 and 197 is 110 volts while the wires 195 and 197 together constitute a circuit of 220 volts and is usually used for rotating the motors of a machine tool assembly.

The solenoid coil 193 has its other end connected through a wire 198 with the center wire 196 of 220-volt circuit for thereby supplying the said solenoid coil 193 with 110 volts of current. Disposed in said wire 198 is a spring-loaded manually actuatable switch 199 which includes a self-energizing magnetic latch 200 (conventially shown in FIG. 7) and which automatically opens when no current is flowing through the line or wire 198.

From the foregoing, and as particularly seen in FIG. 7 the closing of the manual switch 199 through its manually engageable pushbutton closes the circuit that includes the current source wires 195, connecting wire 194 to the solenoid coil 193, the wire 198 from the other end of the solenoid back to the wire 196 of the main electrical circuit and including the switch 199 and latch 200 for latching or holding the switch 199 in operative position.

This current flow energizes the solenoid coil 193 and through the main valve stem acting as the solenoid core actuates the main control valve 129 relative to its sleeve 119 and against the resistance of a spring 201 which tends to resist the main valve movement as well as return same to its normal position after the completion of a complete cycle of operation as will subsequently be made clear. The shifting of the main valve member 129 to its second position connects the hydraulic pump pressure line 114 through its Y-connection 117, and main control valve 118 to and with the pipes or conduits 169 and 170 and thereby simultaneously with the cross slides control valves 135 and 136. Since the slide control valves 135 and 136, particularly the stems 149 and 162, are at this time in the position to connect the pressure in the pipes or conduits 169 and 170 through its end branches 170' and 173 and the pipes or conduits 189 and 192 the pistons 101 and 102 are actuated in directions to actuate the cross slides to cause the tool slides thereon and their saws to approach and penetrate the work, bar stock, effect the severance therefrom of the bar stock sections, all above set forth.

In view of the fact that the work and tool are rotating so rapidly, as hereinabove set forth, the pressure control valve 115 is set to obtain a feed of 0.015 inches per revolution of the work, bar stock, when steel is being worked on while said feed for nonferreous metals such as aluminum the feed rate would be 0.045 inches per work revolution. This movement of the slides continues until, as noted above, the slides have completed their work and are returned to their normal retracted positions.

As noted above the tool slides are stopped upon the same reaching their ultimate inward positions, that is, after each tool side, depending upon the number of saws thereon, has cut its number of portions from the work.

As further noted above the tool slide 36 will complete its work first, and is provided at the inner end thereof, as seen in FIG. 3, with a cam bar 202 to engage and close a switch 203. The switch 203, as seen in FIG. 7, is normally open and upon the said slide 36 reaching its innermost position actuates the movable contact 204 into contact with the fixed contact 205 for thereby completing an electric circuit.

This electric circuit includes a wire 206 extending from the wire 195 of the main electrical circuit and which wire 206 terminates in the movable contact 204. The fixed contact 205 has extending therefrom a wire 207 having its other end connected with one end of a solenoid coil 208 on the stem portion of the slide control valve stem 151, and which solenoid coil 208 has connected with its other end a wire 209 terminating in the wire 196 of the main three wire system.

The energization of the solenoid coil 208 shifts the spool valve stem 151 relative to the control valve sleeve 137 of the cross slide control valve 135 for thereby connecting the pipes or conduits 189 and 190 from the cylinder 99 with the cannelures 149 and 150 wherefore the pipe or conduit from the main pressure conduit 114 passes through the branch 171 of the Y-member 170' and is connected with the pipe or conduit to the cylinder 99 ahead of the piston 101 for driving said piston outwardly, transversely, of the bed. This movement of the piston 92 through the depending arm 94 effects the said outward movement of the cross slide. This movement continues until the piston rod 97 engages the stop screw 107 for thereby locking the said piston and slide in its outer inoperative position.

The hydraulic medium ahead of the piston 182 is ejected from the cylinder through the pipe or conduit 184 to the control valve 135 at which point the said pipe or conduit 184 is connected with the pipe or conduit 175 and therefore the sump 111.

At about this time the second cross slide, cross slide 37 has now completed its work and whereupon substantially duplicate mechanism from that just described is brought into play for reversing the movement of said cross slide 37. This mechanism is as follows:

At the inner end of the cross slide 37 is a switch 210 including a movable contact 211 with which is connected one end of a wire 212 that has its other end connected with wire 196 of the main electric system. The fixed contact 213 of the switch 210 has connected therewith one end of a wire 214 terminating in a solenoid coil 215 which has its core provided by a projecting end of the second slide control valve 136. The other end of the solenoid coil 215 has connected therewith one end of a wire 216 which terminates at its other end in the wire 197 of the main electrical three-wire circuit.

The switch 210 is, again, adapted to be closed by the cross slide 37 for effecting the shifting of the spool valve within the control valve sleeve 152 of the control valve 136 to again cause an outward, transverse, movement of the slide 37. This is effected through the cannelure 166 in the control valve 136 for connecting the hydraulic pressure ahead of the piston 101 and actuating said piston outwardly of the machine and ejecting the hydraulic medium ahead of it through the cannelure 165, pipe or conduit 183 which empties into the pipe or conduit 178 and therefore the sump or tank 111.

It will be now noted that the machine tool has been put through a complete cycle, namely, with the cross slides fully retracted, advanced to and through the work, and again fully retracted to their starting positions. After the bar stock has been advanced to its proper position with its end engaged by the work stop 98 the manually operated starting switch 199 is again pushed for effecting a second complete cycle.

Any suitable or desirable mechanism may be employed for advancing the bar stock after the severance or cutting off therefrom of the number of portions, sleeves, slugs, or the like, and incorporated with this mechanism for operation thereby is an electric switch which would automatically energize the circuit to the main control valve for electrically exciting the solenoid coil of the main control valve and for thereby automatically effecting a repeat of the cycle of operation.

From the foregoing it is now believed obvious that there has been provided a cutoff machine which among other important and specific objects accomplishes the objects initially set forth above.

I claim:

1. In a machine tool of the class described the combination of a supporting bed, means on said bed supporting a workpiece bar with an end axially outwardly of said workpiece support, means on said bed rotating said workpiece-bar-supporting means, said workpiece bar being adapted to have portions of equal length cut from the present end thereof in succession, a pair of slides each respectively mounted on the bed on opposite sides of the workpiece, a spindle on each slide, a toothed circular saw cutter on each spindle and laterally of the workpiece and respectively axially spaced from one another and from the end of the workpiece bar, said toothed circular saw cutters being spaced axially with respect to one another and longitudinally of the axis of the workpiece bar, whereby the toothed circular saw on the spindle nearest to the end of the workpiece bar will cut and completely sever the said end of the workpiece bar prior to the cutting and complete severance of the second end of the workpiece bar by the second toothed circular saw cutter, means rotating each of said saw cutters, and means simultaneously actuating said rotating toothed circular saw cutter slides toward one another for effecting the said succession of the cut off workpiece ends.

2. In a machine tool of the class described as set forth in claim 1 characterized by, one of said rotating toothed circular saw cutter spindles having thereon a second toothed circular saw cutter spaced axially of the workpiece bar a distance from the toothed circular saw cutter on the other spindle that the said toothed circular saw cutter on said second spindle is spaced from the first toothed circular saw cutter, and said second toothed circular saw cutter on the spindle being of a diameter less than the first toothed circular saw cutter wherefore each of the other toothed circular saw cutters removes its workpiece bar end prior to the said removal of the bar end by the first spindle-toothed circular saw cutter.

3. In a machine tool of the class described as set forth in claim 1 characterized by, one of said rotating toothed circular saw cutter spindles having thereon a second toothed circular saw cutter spaced axially of the workpiece bar a distance from the toothed circular saw cutter on the other spindle that the said toothed circular saw cutter on said second spindle is spaced from the first toothed circular saw cutter, said second toothed circular saw cutter on the spindle being of a diameter less than the first toothed circular saw cutter wherefore each of the other toothed circular saw cutters removes its workpiece bar end prior to the said removal of the bar end by the first spindle toothed circular saw cutter, said means supporting the workpiece bar for rotation including a headstock on said bed having a hollow spindle centrally of which the said workpiece bar extends, and means associated with said headstock and its hollow spindle for securing the workpiece bar to the headstock spindle.

4. In a machine tool of the class described as set forth in claim 1 characterized by, one of said rotating toothed circular saw cutter spindles having thereon a second toothed circular saw cutter spaced axially of the workpiece bar a distance from the toothed circular saw cutter on the other spindle that the said toothed circular saw cutter on said second spindle is spaced from the first toothed circular saw cutter, said second toothed circular saw cutter on the spindle being of a diameter less than the first toothed circular saw cutter wherefore each of the other toothed circular saw cutters removes its workpiece bar end prior to the said removal of the bar end by the first spindle toothed circular saw cutter, said means supporting the workpiece bar for rotation including a headstock on said bed having a hollow spindle centrally of which the said workpiece bar extends, means associated with said headstock and its hollow spindle for securing the workpiece bar to the headstock spindle, means automatically advancing the workpiece bar through the headstock hollow spindle, and stop means limiting the movement of the workpiece bar relative to the spindle.

5. In a machine tool of the class described for cutting off the ends of a metallic workpiece bar individually and in succession, the combination of a supporting bed, means on said bed supporting said metallic workpiece bar with a portion thereof, freely, outwardly thereof, means on said bed rotating said workpiece bar supporting means, said workpiece bar being adapted to have a plurality of portions thereof, each of an identical length, removed inwardly of its end, in succession, a spindle adjacent the workpiece bar with its axis parallel to the axis of said workpiece bar, a pair of toothed circular saw cutters on the spindle each having parallel sides at right angles to the spindle and workpiece bar axes, said successive saws inwardly from the workpiece bar end being successively smaller in diameter, means mounting said saw spindle and workpiece bar support for relative feeding movement whereby successive toothed circular saw cutters cuts from the end of the workpiece bar successive end portions, a motor carried by the bed connected with the toothed circular saw cutters spindle or the rotating workpiece bar support, and said means connecting said motor with said movable spindle or workpiece-bar-rotating support including an extensible means for providing a positive nonslip drive between said motor and the said rotating workpiece bar support or toothed circular saw cutters spindle during the relative movement of the saw spindle and workpiece bar support.

6. In a machine tool of the class described as set forth in claim 5, characterized by, a second spindle having its axis parallel with and laterally of the axis of the first spindle and on the side of the workpiece bar opposite to that on which the first spindle is located, a toothed circular saw cutter on said second spindle, said toothed circular saw cutter on said second spindle being carried thereby relative to the toothed circular saw cutters on the first spindle to cut from the end of the workpiece bar a portion equal in length to the portion of the workpiece bar cut by the first toothed circular saw cutters on the first spindle, and said toothed circular saw cutter being mounted on said second spindle with relation to said first spindle for movement toward and from the workpiece axis for cutting off said portion of the workpiece bar inwardly of its end after said first spindle first toothed circular saw cutter has cut its piece.

7. In a machine tool of the class described as set forth in claim 5, characterized by, means on said bed and associated with said supporting means for said workpiece bar for axially advancing the workpiece bar after the removal therefrom of the workpiece bar ends, and stop means positioning said workpiece bar with respect to the toothed circular cutoff cutters.

8. In a machine tool of the class described as set forth in claim 5, characterized by, a second spindle having its axis parallel with and laterally of the axis of the first spindle and on the side of the workpiece bar opposite to that on which the first spindle is located, a toothed circular saw cutter on said second spindle, said toothed circular saw cutter on said second spindle being carried thereby relative to the toothed circular saw cutters on the first spindle to cut from the end of the workpiece bar a portion equal in length to the portion of the workpiece bar cut by the first toothed circular saw cutter on the first spindle, said toothed circular saw cutter being mounted on said second spindle with relation to said first spindle for movement toward and from the workpiece axis for cutting off said portion of the workpiece bar inwardly of its end after said first spindle first toothed circular saw cutter has cut off its piece, means on said bed and associated with said supporting means for said workpiece bar for advancing same after the removal therefrom of the workpiece bar ends, and stop means positioning said workpiece bar with respect to the toothed circular saw cutters.

9. In a machine tool of the class described as set forth in claim 5, characterized by, said means for mounting, at least, one of the saw spindle or workpiece bar support being in the form of a slide mounted on the bed, and said means for moving said toothed circular saw and workpiece bar support effecting the movement of the slide relative to the bed and relative to the toothed circular saw cutter and the workpiece bar axes.

10. In a machine tool of the class described as set forth in claim 5, characterized by, said means for mounting, at least, one of the saw spindle and workpiece bar support being in the form of a slide mounted on the bed, and hydraulic fluid operated means including an hydraulic fluid under pressure for shifting the slide on the bed and relative to the workpiece bar and the toothed circular saw cutter axes.

11. In a machine tool of the class described as set forth in claim 5, characterized by, a second spindle having its axis parallel with and laterally of the axis of the first spindle and on the side of the workpiece bar opposite to that on which the first spindle is located, a toothed circular saw cutter on said second spindle, said toothed circular saw cutter on said second spindle being carried thereby relative to the toothed circular saw cutters on the first spindle to cut from the end of the workpiece bar a portion equal in length of the portion of the workpiece bar cut by the first toothed circular saw cutter on the first spindle, said toothed circular saw cutter being mounted on said second spindle with relation to said first spindle for movement toward and from the workpiece axis for cutting off said portion of the workpiece bar inwardly of its end after said first spindle first toothed circular saw cutter has cut its portion, each of said spindles being mounted on a slide independently supported and operated on the bed, and means for effecting the said independent movement of the saw spindles slides toward the workpiece bar .

12. In a machine tool of the class described as set forth in claim 5, characterized by, a second spindle having its axis parallel with and laterally of the axis of the first spindle and on the side of the workpiece bar opposite to that on which the first spindle is located, a toothed circular saw cutter on said second spindle, said toothed circular saw cutter on said second spindle being carried thereby relative to the toothed circular saw cutters on the first spindle to cut from the end of the workpiece bar a portion equal in length to the portion of the workpiece bar cut by the first toothed circular saw cutter on the first spindle, said toothed circular saw cutter being mounted on said second spindle with relation to said first spindle for movement toward and from the workpiece axis for cutting off said portion of the workpiece bar inwardly of its end after said first spindle first toothed circular saw cutter has cut its portion, each of said spindles being mounted on a slide independently supported and operated on the bed, and hydraulic fluid operated means including an hydraulic fluid under pressure for shifting the slides on the bed and relative to the workpiece bar and the toothed circular saw cutter axes.

13. In a machine tool of the class described as set forth in claim 5, characterized by, said means for mounting, at least, one of the saw spindle and workpiece bar support being in the form of a slide mounted on the bed, means for moving said slide relative to the bed and relative to the toothed circular saw cutter and the workpiece bar axis, means on said bed and associated with said supporting means for said workpiece bar for advancing same after the removal therefrom of the workpiece bar ends, and stop means positioning said workpiece bar with respect to the toothed circular saw cutters.

14. In a machine tool of the class described as set forth in claim 5, characterized by, a second spindle having its axis parallel with and laterally of the axis of the first spindle and on the side of the workpiece bar opposite to that on which the first spindle is located, a toothed circular saw cutter on said second spindle, said toothed circular saw cutter on said second spindle being carried thereby relative to the toothed circular saw cutters on the first spindle to cut from the end of the workpiece bar a portion equal in length to the portion of the workpiece bar cut by the first toothed circular saw cutter on the first spindle, said toothed circular saw cutter being mounted on said second spindle with relation to said first spindle for movement toward and from the workpiece axis for cutting off said portion of the workpiece bar inwardly of its end after said first spindle first toothed circular saw cutter has cut its portion, each of said spindles being mounted on a slide independently supported and operated on the bed, means for effecting the said independent movement of the saw spindles slides toward the workpiece bar, means on said bed and associated with said supporting means for said workpiece bar for advancing same after the removal therefrom of the workpiece bar ends, and stop means positioning said workpiece bar with respect to the toothed circular saw cutters.

15. In a machine tool of the class described for cutting off the end of a metallic workpiece bar the combination of a supporting bed, means on said bed for supporting said metallic workpiece bar with a portion thereof, freely, outwardly of the supporting means and from which at least two substantially equal length pieces are to be removed in succession, means on said bed rotating said workpiece-bar-supporting means, a plurality of toothed circular saw cutters supported on said bed laterally of the workpiece bar for rotation about an axis parallel to the axis of the metallic workpiece bar, said toothed circular saw cutters each having parallel sides at right angles to the workpiece bar and axis of said toothed circular saw cutters and, respectively, spaced inwardly of the end of the workpiece bar so that one toothed circular saw cutter is spaced a distance corresponding to the desired length of the workpiece bar end to be cut off and the second toothed circular saw cutter spaced inwardly of the first toothed circular saw cutter a distance equal to the spacing of the said first toothed circular saw cutter from the end of the workpiece, said toothed circular saw cutter from the end of the workpiece, said toothed circular saw cutters each having a diameter sufficient to pass through the workpiece bar from a point on its periphery to a point to its axis sufficient to effect the cutoff of the workpiece bar end, means connected with the toothed circular saw cutters for rotating same with their respective sides at right angles to the axis of the workpiece bar, a slide on said bed between itself and one of the workpiece bar support and rotating toothed circular saw cutter support for moving the same on the bed relative to the other, means automatically shifting and advancing said slide with its supported member relative to the other whereby the workpiece bar has first one piece cut therefrom and then a second piece cut therefrom, means connected with the automatically shiftable slide including the member supported thereby and comprising a motor remote from said rotating member, and extensible means between said motor and said member providing a positive nonslip drive during movement of the said slide and supported member toward and from the cutting off position.

16. In a machine tool of the class described for cutting off the end of a metallic workpiece bar the combination of a supporting bed, a headstock on said bed having a hollow spindle through which extends and being supported thereby is said workpiece bar with a given portion thereof freely, outwardly, of the supporting headstock hollow spindle and from which projecting portion of the workpiece bar, at least, two pieces are to be removed in succession, means on said bed for rotating said workpiece bar through the rotation of the hollow spindle, a toothed circular saw cutter spindle supporting, at least, two toothed circular saw cutters on said bed laterally of the workpiece bar and rotatable about an axis parallel to the axis of the metallic workpiece bar, said toothed circular saw cutters each having parallel sides at right angles to the workpiece bar and axis of the said toothed circular saw cutters and, respectively, said toothed circular saw cutters spaced inwardly from the end of the workpiece bar so that one toothed circular saw cutter is spaced a distance corresponding to a desired length of the workpiece bar end to be cut off and the second toothed circular saw cutter spaced inwardly of the first toothed circular saw cutter a distance corresponding to the desired length of the workpiece bar left after the complete severance of said first end portion, said toothed circular saw cutters each having a dissimilar diameter but each having a diameter sufficient to pass through the workpiece bar from the point on said periphery to a point toward its axis sufficient to effect the cut off of the workpiece bar end, a motor supported on said supporting bed connected with the toothed circular saw cutters spindle for rotating the said saws with their respective sides at right angles to the workpiece bar, a slide on said bed between said bed and the toothed circular saw cutters spindle for moving the same on the bed relative thereto, said toothed circular saw cutter rotating motor including a drive shaft having at its free end a universal joint, said toothed circular saw cutter spindle having at its end a universal joint, extendable means between said universal joints providing a positive nonslip drive between said motor and said cutters spindle whereby the toothed circular saw cutters are rotated through the rotation of their spindle, and means automatically shifting and advancing said slide with its supported spindle relative to the motor whereby the workpiece bar has, first, one piece completely cut therefrom and permitted by gravity to drop from its operative position, and then the second piece is completely cut from the workpiece bar and permitted by gravity to drop from its position.

17. In a machine tool of the class described for cutting off the end of a metallic workpiece bar as set forth in claim 16 characterized by, expansible means between said universal joints whereby rotation of the circular saw cutter continues during the movement of the slide including a rod from one of the universal joints, a tube from the other universal joint slidable on the rod during movement of the saw in a workpiece cutoff direction, and a key and spline between the rod and tube to permit continued rotation of said circular saw cutter, during the movement toward and from the workpiece axis.

18. In a machine tool of the class described for cutting off the end of a metallic workpiece bar as set forth in claim 16 characterized by, expansible means between said universal joints whereby rotation of the circular saw cutter continues during the movement of the slide including a rod from one of the universal joints, a tube from the other universal joint slidable on the rod during movement of the saw in a workpiece cutoff direction, and a key and spline between the rod and tube to permit continued rotation of said circular saw cutter, during the movement toward and from the workpiece axis, said means for feeding the slide having secured thereto a movable member, said bed having secured thereto a stationary member relative to which the slide and its saws bearing spindle is moved, and means under power for effecting the movement of the movable member relative to the fixed member.

19. In a machine tool of the class described for cutting off the end of a metallic workpiece bar as set forth in claim 16 characterized by, expansible means between said universal joints whereby rotation of the circular saw cutter continues during the movement of the slide including a rod from one of the universal joints, a tube from the other universal joint slidable on the rod during movement of the saw in a workpiece cutoff direction, and a key and spline between the rod and tube to permit continued rotation of said circular saw cutter, during the movement toward and from the workpiece axis, said means for automatically actuating the slide having secured thereto a movable member, said bed having secured thereto a stationary member relative to which the slide and its movable member is moved, and means adjustable limiting the amount of movement of the slide moving means and therefore the movement of the slide in the feeding direction laterally of the workpiece bar.

20. In a machine tool of the class described for cutting off the end of a metallic workpiece bar as set forth in claim 16 characterized by, expansible means between said universal joints whereby rotation of the circular saw cutter continues during the movement of the slide including a rod from one of the universal joints, a tube from the other universal joint slidable on the rod during movement of the saw in a workpiece cutoff direction, and a key and spline between the rod and tube to permit continued rotation of said circular saw cutter, during the movement toward and from the workpiece axis, said means for automatically actuating the slide having secured thereto a piston, a cylinder carried by the bed enclosing the piston for movement relative to one another, and an hydraulic medium under pressure connected alternately with opposite sides of the piston for reciprocating the same within the cylinder and thereby reciprocating the slide.

21. In a machine tool of the class described for cutting off the end of a metallic workpiece bar as set forth in claim 16 characterized by, expansible means between said universal joints whereby rotation of the circular saw cutter continues during the movement of the slide including a rod from one of the universal joints, a tube from the other universal joint slidable on the rod during movement of the saw in a workpiece cutoff direction, and a key and spline between the rod and tube to permit continued rotation of said circular saw cutter, during the movement toward and from the workpiece axis, said means for automatically actuating the slide having secured thereto a piston, a cylinder carried by the bed enclosing the piston for movement relative to one another, an hydraulic medium under pressure connected alternately with opposite sides of the piston for reciprocating the same within the cylinder and thereby reciprocating the slide, and means carried by the bed and adjustable relative thereto for stopping the movement of the slide in each direction.